D. H. LENTZ.
PROCESS OF BALLING SCRAP METAL.
APPLICATION FILED JAN. 6, 1911.

1,012,871.

Patented Dec. 26, 1911.

UNITED STATES PATENT OFFICE.

DAVID H. LENTZ, OF CHICAGO, ILLINOIS.

PROCESS OF BALLING SCRAP METAL.

1,012,871.  Specification of Letters Patent.  Patented Dec. 26, 1911.

Application filed January 6, 1911. Serial No. 601,131.

*To all whom it may concern:*

Be it known that I, DAVID H. LENTZ, a citizen of the United States, residing at Chicago, in the county of Cook and State of Illinois, have invented certain new and useful Improvements in Processes of Balling Scrap Metal, of which the following is a specification.

My invention relates to a new and improved process of welding scrap metal into relatively solid bodies of iron, especially in such a process for directly welding a mass of scrap metal into a substantially homogeneous body of iron of a character suitable for immediately forming into a bloom or billet and, in the preferred practice of my process, this is accomplished by "balling" the scrap metal, that is, by automatically welding it directly into a substantially homogeneous, roughly spherical body of a character, density and form suitable for directly forming into a bloom or billet of any required size by treatment in a "squeezer" and rolls in a familiar manner. Especially is my new process adapted for rapidly bringing about this result with charges composed of scraps of iron of varying sizes and weight, without previous cleaning.

A further object of my invention is to attain these results more rapidly than has heretofore been possible, with unskilled labor and at a greatly reduced fuel cost per ton of metal treated, while at the same time producing a denser and more homogeneous product than has been possible with any methods heretofore known.

Another object of my invention is to provide a method for the treatment of common scrap metal, such as ordinary railroad scrap iron, so as to simultaneously purify the same, raise it to a welding temperature and roughly weld it into a mass suitable, without reheating, for being rolled directly into a homogeneous billet of refined iron and all with a minimum fuel consumption and a minimum loss by oxidation.

Scrap metal has been formed into billets or the like by making piles or fagots of the material, heating the same and then passing them through rolls. This method is costly and in other respects undesirable. In order that the billet should have a good "skin", that is, in order that its surface should be clear of irregularities and sufficiently tough to allow the billet to be put through subsequent rolling operations and also in order to confine the small pieces of loose scrap so that the charge can be passed through rolls and welded together when brought to the proper temperature, it is necessary to inclose the smaller pieces of scrap in a box made up of strips or sheets of fairly high grade metal. This latter metal is comparatively expensive. Moreover, the piling has to be done by hand and the heating of the piles in order to get the metal into a condition to weld is the work of skilled laborers. In addition, the scrap, at least of the cheaper grade, is likely to be covered with dirt, rust, scale and the like, which, of course, injuriously affect the quality of the product. It will also be seen that either this scrap in the charge must be first subjected to a tumbling or other cleaning operation, which means an item of additional expense, or else that the superficial scale, rust and other impurities will be inclosed within the charge and, whether subjected to a previous tumbling operation or not, there will ordinarily be a considerable percentage of impurities adhering to the surface of the scrap in the charge. These impurities will necessarily be incorporated in the resulting billet when charges so made up are heated and welded into a billet by passing through rolls, except as a part of such impurities may escape in the form of cinder. Consequently in all processes heretofore practiced commercially for the utilization of scrap, the resulting product has been necessarily impure and of an inferior quality, whereas, with my process, this same quality of scrap may be utilized to produce a high grade, refined iron of very superior quality with an actual saving in labor, cost, fuel and furnace loss. Another objection to this old method is due to the fact that, with the charges of metal thus piled together, the interior of each charge heats more slowly than the exterior, so that the entire charge must be subjected to a high temperature until the interior of the charge is brought to a welding heat. This not only increases the fuel cost and calls for skill on the part of the laborer attending to the heating of the charge, but results in an objectionably prolonged heating of the outer part of each charge with a resulting loss by oxidation, which, together with the loss because of the rust, scale, etc., contained in each charge which is considerable, results in an excessive production of "cinder," and tends to lower the quality of the resulting billet when the heated charge is rolled into a bar.

According to another familiar process, scrap has been balled by hand in busheling furnaces. This work must also be done by high-priced, skilled labor and the size of the balls is necessarily limited to that which can be conveniently manipulated by hand. The balls so formed are in fact necessarily so small that it is not practical to produce large billets from them. At least, a billet cannot be rolled from a single hand made ball which will be large enough for many purposes. Furthermore, the loss in busheling furnaces by oxidation is excessive. This probably results from the fact that the smaller pieces of the charge are subjected to the same temperature as the larger pieces and to the high temperature for the same length of time. The balls so formed are not apt to be uniform and homogeneous in their constitution, because it follows inevitably that certain parts of the charge are more thoroughly heated than others. Furthermore, the operation of hand busheling is of such a character that the resulting "ball" is only very roughly a ball and is of such a light and porous character that a ball, weighing say two hundred pounds, which is about the ordinary size which can be readily produced by a workman in a busheling furnace, is of substantially the same size as a five hundred pound ball produced by my new process, and, at the same time, the surface of such hand busheled ball is so rough and irregular that it cannot be rolled or formed directly into a billet suitable for rolling into commercial articles. Consequently, the practice is to roll such balls into "muck bars," which are then used to form the boxes inclosing piles of scrap metal, which are then heated to a welding heat in a furnace, as stated in the previous paragraph, and rolled into billets. So, also, the process of hand busheling in a busheling furnace is unnecessarily expensive in fuel cost.

My process, which involves several features preferably, though not necessarily, used in conjunction, obviates, or at least minimizes, the objections to the methods of welding scrap above described. According to this process, the balling can be done entirely by machinery, thus eliminating high priced hand labor. A much larger ball can be formed than is possible in a busheling furnace; in fact, a ball can be produced from which a billet can be formed large enough for almost any of the ordinary rolling operations.

An additional feature of advantage of my process, which makes machine balling of scrap practical, is that, where the balling is done by machinery, it is possible to produce in the balling furnace a ball which is, for all practical purposes, truly spherical, which shape is necessary for the most successful, economical handling of the ball in the squeezer, because no care need be taken in positioning the ball in the squeezer in any particular manner and, under the pressure of the squeezer, which will be equally distributed in all directions, the ball will be given a regular shape which is desirable for the most economical and best handling of the metal in the rolls after leaving the squeezer. Further, the scrap is heated in such way as to minimize oxidation and obtain a heating to approximately a uniform degree of the entire charge. As an additional feature, the scrap is cleaned and the impurities removed before it goes into the welding chamber. This improves the product and also minimizes the deposit of slag in the welding chamber. According to this improved process, the scrap is subjected to a preheating operation before it reaches the welding or balling chamber. Preferably the temperature to which the charge is subjected in preheating is at first comparatively low and is afterward increased. Preferably the scrap is caused to travel from an initial temperature through a heating zone in which the temperature gradually increases until it reaches the welding temperature in the balling chamber. Preferably also the scrap is spread out and agitated or kept in motion, by preference rolled over a highly heated, hard surface while being subjected to the initial heating; the purpose of this being to thoroughly heat all of the pieces of the charge and heat them on all sides. This agitation also dislodges the scale, rust and the like with which the scrap is apt to be incrusted, and preferably these impurities are carried off by a hot blast which accomplishes the preheating.

As an additional feature of the process, the preheating operation involves preferably a feeding of the material into the balling chamber and is preferably carried out so that a separation is made between the pieces according to weight, the heavier pieces reaching the balling chamber before those which are relatively lighter. By this means the heavier parts of the charge, which need the most heat, are subjected to the intensely high temperature of the balling chamber for a longer period of time than the lighter pieces. Eventually all of the charge is collected in the balling chamber and agglomerated in the form of a ball by being rolled in contact with the hard surface of the interior of the balling chamber. The ball thus formed, after being removed from the furnace, may be put through a squeezer, of familiar construction, while still hot, and is then ready for the rolls, with or without reheating, as the case may be. It will thus be seen that, without any separate treatment, the superficial impurities are removed, that the entire charge need be exposed to a high temperature only long enough to bring the largest pieces to a welding temperature, thus decreasing the fuel cost and very greatly increasing the speed with which the entire charge is heated, and that, in the preferred practice of my process, the heavier parts of the charge are hurried ahead into the zone of more intense heat, while the lighter particles are held back in a milder heat, so that it is substantially true that all parts of the charge are brought to a welding heat at practically the same time, the various pieces being subjected to the most intense heat for varying lengths of time according to their respective weights, thus very largely eliminating the loss by oxidation. It will also be seen that the charge, after being first scattered, is collected together again only when the parts have all been brought to a welding heat, thus avoiding the difficulties and objections incident to attempting to heat the charge in a body, while nevertheless utilizing the weight of the mass of the charge to weld the particles of scrap together into a single mass.

As stated, this process decreases the amount of slag deposited in the balling chamber by removal of incrusted impurities during the preheating stage and by minimizing oxidation. There will necessarily be some slag, however, in the balling chamber and this I can control by throwing into the chamber, after each balling operation, a quantity of finely divided metal, such as iron borings for example, which, when melted, mix with the slag, the mixture being absorbed by the ball subsequently formed, or by drawing off any excess slag, although with this treatment the slag not absorbed will be of relatively small quantity. Any excess of slag which is absorbed, as the result of this treatment, will, of course, be removed when the ball is put through the squeezer.

I am aware that it has been proposed to ball scrap mechanically in a rotary furnace, but, so far as I am aware, the efforts in this line, up to the time of my invention, have not proved successful.

The process in its details will be best understood by reference to the accompanying drawings, which show, somewhat diagrammatically, two forms of furnace, somewhat different in their construction, but both suitable for carrying out the process. It will be understood, however, that the invention is not limited to the use of either of these apparatuses, as it might well be possible to practice the process by means of apparatus differently constructed.

In these drawings.

Like characters of reference indicate like parts in the several figures of the drawings.

Figure 1:
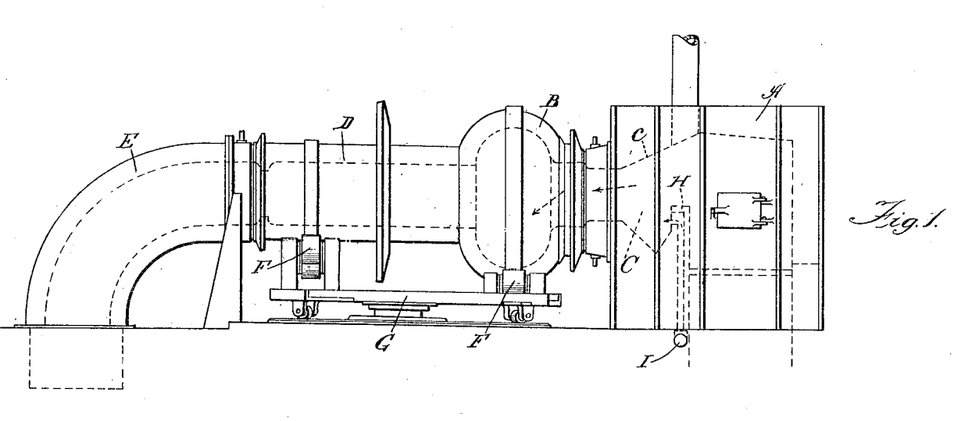
Figure 1 is a side elevation of one form of furnace.
Figure 2:
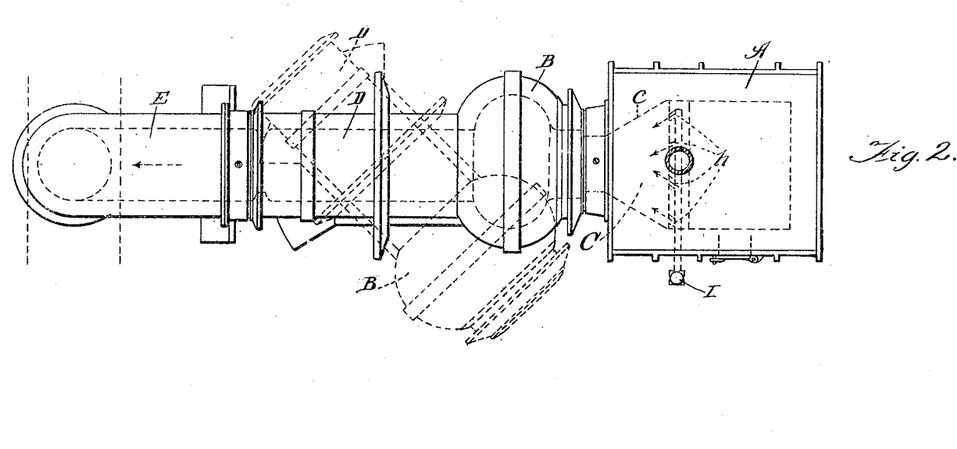
Fig. 2 is a plan view of the same.

Referring first to Figs. 1 and 2, A represents the fire box, B the rotary welding chamber which communicates at one end with a flame-way C leading from the fire box, D a barrel or cylindrical tumbler, as it may be termed, and E a flue, preferably a down flue, which carries off the products of combustion from the barrel D. The rotary portion of the furnace B, D is mounted on rollers F supported on a turn-table G. The rotary element is preferably mounted so that the axis thereof is oblique to the horizontal, the end of the barrel adjoining the balling chamber being lower than the other end. The furnace is charged by rotating the turn-table so as to bring the barrel to the position of the dotted lines in Fig. 2, the charge being introduced at the upper end of the barrel, while the "ball" is being removed from the balling chamber. When the rotary is returned to its normal position, it is revolved on its axis by any suitable mechanism (not shown).

For the best results, the barrel and balling chamber are lined with fire brick or similar refractory material, which is preferably brought to a very high temperature before the treatment of the metal begins. To attain the highest efficiency, as nearly perfect combustion as possible is brought about in the combustion chamber and the resulting flame is discharged, by a suitable construction of the flame-way, diagonally toward the bottom of the balling chamber, preferably so as to sweep the bottom of the balling chamber, which result is best obtained by the form of chamber shown in Fig. 4, and thence rising to sweep through the barrel and out through the stack. To maintain the most efficient temperature in the balling chamber, the joint between the balling chamber and the furnace is inclined toward the furnace, so that any tendency to develop an inflow of air, which might cool the chamber, create undue oxidation and "cut the iron" is opposed by the line of travel of the blast of flame discharged from the combustion chamber into the rotary portion of the furnace. It will be noted that the joint between the charging end of the rotary member and the flame discharge point extends at an angle, tending to draw in air, but this is a matter of minor importance so far as the present invention is concerned, although it tends to affect the combustion so that no smoke is discharged through the stack.

In practice I attain the best results by developing a white hot heat in the balling chamber, the temperature from the balling chamber through the rotating barrel diminishing, so that adjacent to the stack I usually find the burning gases a light lemon color.

The furnace having been brought to a proper temperature, the rotating member is swung to the position shown in dotted lines in Fig. 2 and the charge is deposited in a mass in the charging end of the barrel. This barrel is preferably of such length, with relation to the angle of inclination from the charging end to the balling chamber, that the entire charge will be spread out and separated into individual units, as the rotation of the barrel causes the charge to travel toward the balling chamber.

The initial rotation of the barrel causes a spreading of the charge longitudinally and transversely of the barrel and the inclination of the same eventually feeds the scrap into the balling chamber B. If the charge consists of pieces of different sizes, the heavier pieces will travel more rapidly and reach the balling chamber before those which are relatively lighter. The charge spread out in the barrel is subjected to the hot blast from the fire box A, the heat of which increases as the metal approaches the balling chamber. During this feeding operation the pieces of metal are rolled around the inner surface of the barrel, so that the pieces are heated on all sides. Moreover, the agitation to which the charge is thus subjected results in dislodging the incrusted scale, dirt, rust and the like, and these impurities are carried off by the hot blast. Eventually all of the charge is collected in the balling chamber and there formed into an agglomeration of more or less spherical form. The ball thus formed is rolled around until it is sufficiently compact and spherical and until all of the metal is collected and, after the rotary has again been shifted to the dotted line position in Fig. 2, can be removed and put through the squeezer.

The barrel may be of such length with relation to the inclination of its bottom and to its speed of rotation that, with the proper temperature maintained, the entire charge will be brought to a welding temperature substantially during the time it takes for the smallest or lightest particles to travel from the charging end of the barrel into the balling chamber, or with a shorter barrel and a suitable peep-hole, which I have used with marked success, the barrel will be first operated with a succession of rotations and stops, until all particles of the charge have been brought to a welding heat and conveyed into the balling chamber, whereupon the barrel, with the balling chamber, will then be rotated at a relatively high speed until the charge is welded together into a ball. The reasons for this operation are these: First, the barrel is preferably rotated until the individual pieces of scrap composing the charge are separated and spread out on the highly heated, refractory lining of the barrel, whereby each piece is surrounded by the blast of flame passing through the barrel, except the surface which rests upon the white hot lining. The barrel is then given a succession of short rotations, so that each particle of the charge is shifted to a new surface in the bottom of the barrel, thus removing it from the surface upon which it has been rested and which has slightly cooled and also tending to turn over each particle. At the same time, these successive rotations of the barrel tend to carry the heavier particles into the zone of higher temperature and to drop them into the balling chamber in advance of the lighter particles. By these operations, the travel of the lightest particles into the zone of highest temperature is delayed until these lightest particles are brought to a welding heat, by which time the heavier particles, which have arrived in the zone of highest temperature in advance of the lighter pieces, have also been brought to a welding heat, whereupon, to minimize loss by oxidation, it is now desirable to weld the mass together as rapidly as possible, and this is accomplished by a continuous rotation of the balling chamber at a relatively high speed, whereby the weight of the mass is utilized to weld together the individual particles, all of which have been brought to a welding temperature.

Of course, the charge may be so large that the individual units can not be spread separately on the white hot lining, but nevertheless the charge will assume the form of an elongated, loose pile, over and through which the blast of heat will pass and through which heat will be radiated from the heated refractory lining. The continuous or intermittent rotation of the rotary will not only repeatedly change the positions of the individual units of the charge, so that they will be heated, cleaned and purified on all surfaces, but will also shift the charge as an entirety to different surfaces of the refractory lining, so as to most efficiently utilize the heat radiated therefrom and maintain a substantially uniform heating of the refractory lining, instead of permitting the charge to remain on one surface of the lining until such surface of the lining is objectionably cool.

In actual practice I have repeatedly v ued charges of five hundred pounds of scrap metal into a substantially spherical ball within seven minutes from the time the cold charge was fed into the charging end of the barrel, while I have operated such an apparatus as is shown in the drawings for eight hours at a time, so as, with one machine, to convert five hundred pounds of cold scrap iron into a relatively solid, roughly spherical ball once in every ten minutes, the time being roughly divided into five minutes for the preheating and travel of the scrap through the barrel and somewhat less than five minutes for forming the ball in the balling chamber, the ball being removed from the balling chamber and the next charge put in simultaneously, this operation taking about fifteen seconds from the time the rotary member is swung to the dotted position shown in Fig. 2 until it is swung back again into operating position.

In order to increase the temperature of the furnace, the fire box is constructed with a bridge wall H perforated as indicated at $h$ and air is introduced into the furnace through these perforations by means of a pipe I. Preferably the bridge wall is so located that the air blasts pass through the lower part of the flame-way. It will be obvious that any other means might be employed for increasing the supply of oxygen in the furnace. In order that the products of combustion from the fire box may be directed downwardly into the balling chamber, the fire box has preferably the slanted wall $c$ above the bridge wall. Flue E is a down draft flue in order that the hot flames passing through the barrel may be kept down close to the metal.

After taking out the ball, I preferably throw a quantity of iron borings into the balling chamber. This, when heated up, unites with the slag and the mixture is absorbed by the ball which is subsequently made. Obviously it may not be necessary to perform this operation after each ball, while, if any excess of slag should develop, it can be drawn off from time to time through a suitable port in the balling chamber, although such operation will be necessary only at rare intervals.

Figures 3, 4:
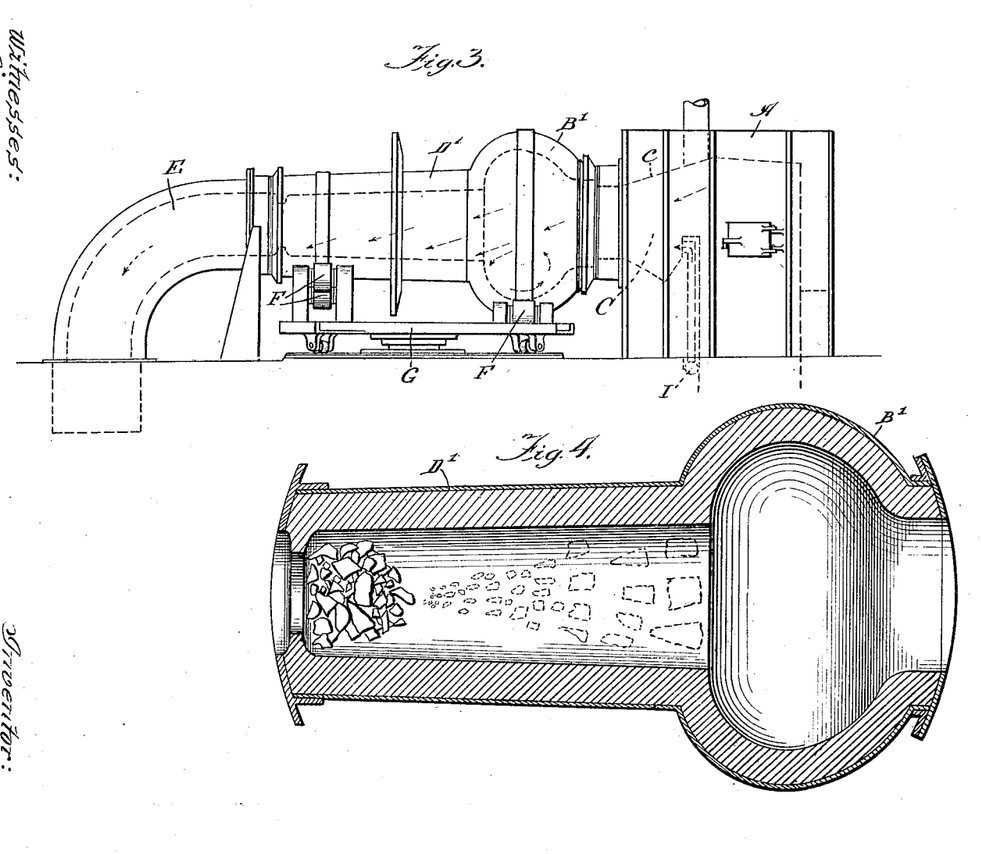
Fig. 3 is a side elevation of another furnace.
Fig. 4 is a sectional plan of the rotary element thereof.

In Figs. 3 and 4 is shown a modified form of furnace. The rotary element, here designated B', D', may be mounted with its axis either horizontal or somewhat oblique, as in the case of the other furnace, preferably the latter. In either event the barrel D' is tapered, being larger at the balling chamber end than at the feeding-in end. The tapered or flared barrel I consider preferable to the straight barrel shown in the preceding figures, because it gives a better feed of the scrap, the taper of the barrel overcoming any tendency of the scrap to roll or crowd back. The configuration of the balling chamber is likewise different. The curvature of the portion of the inner surface of the balling chamber B' adjacent the fire box is on a greater arc than that of the portion adjacent the barrel. That is, the portion of the surface on which the ball rolls owing to the tilting of the rotary element is flattened and broadened, so that, as the ball turns over with the revolution of the balling chamber, it has also a tendency to roll a trifle in a direction at right angles to its general line of travel, that is, backwardly toward the barrel and into the bottom of the balling chamber. This insures a substantially spherical shape to the ball. This shape of the balling chamber also gives added efficiency, because it permits the downwardly directed flame to travel across and close to the bottom of the balling chamber, so as to direct the most intense heat against the charge in the balling chamber as the pieces of scrap begin to drop into that chamber, while, as the ball begins to form, the flame will strike against the ball in the bottom of the chamber and spread, so as to surround the ball, whereas the form of chamber shown in Fig. 1 tends to direct the blast of flame away from the bottom of the chamber.

In Fig. 4 the feeding of a charge of the scrap is illustrated diagrammatically, the differences in size between the different pieces being considerably exaggerated for the purpose of making the illustration more graphic.

I do not claim herein the apparatus shown and described, as such apparatus forms the subject-matter of my co-pending application Serial No. 601,132 filed January 6, 1911.

While, for convenient terminology, I have referred to my process in the claims as the "art of balling" scrap and in the preferred practice of my operation this term is absolutely correct, because the scrap is formed into a sphere, nevertheless it should be understood that my invention may be practiced to advantage in forming or welding the scrap into forms other than that of a sphere, and it should, therefore, be understood that the term "balling" as used in the claims, applies to the process regardless of the particular shape given to the mass in the finishing chamber, which is for convenience termed the "balling" chamber, because ordinarily the mass will be formed into a roughly spherical mass in that chamber.

It should also be understood that where in the claims I refer to "mechanically" balling scrap, this term is used to designate the process whereby the scrap is welded or formed into a mass by the operation of mechanism after the scrap has been brought to a welding condition, as distinguished from the manual manipulation of the mass of scrap into a ball or other unitary form.

The foregoing specification will fully explain to those skilled in the art the advantages of and method of practicing my process. They will understand that the balling of scrap iron is a preliminary step for raising the scrap to a welding temperature and roughly welding or agglomerating it into a single mass which can then be passed as a unitary body through squeezers and rolls which complete the welding and reduce the mass to a homogeneous body of iron, and that, therefore, the balling operation is completed whenever this result is attained regardless of the precise contour or consistency of the ball, although a relatively compact ball, such as will be produced by my process, is preferable, because it occupies less bulk for the same weight of material, can, therefore, be more readily handled and passed through the squeezers and rolls, requires less rolling to weld it to a homogeneous mass and, therefore, can be brought to more complete form without reheating after the ball is produced. For these reasons it will ordinarily be of no utility to continue the welding or balling operation in the balling chamber after the charge has been sufficiently welded together to enable it to be handled as a single mass, for such continued treatment involves an unnecessary furnace loss and fuel expense and the further steps of reducing the ball to a homogeneous body of iron can better be accomplished in devices such as the squeezers and rolls.

I claim:

1. The improvement in the art of balling scrap, which consists in subjecting the scrap to a preheating operation and thereupon introducing the scrap so heated, and in a loose mass into a zone of welding temperature and there welding the same into a ball.

2. The improvement in the art of balling scrap, which comprises passing a loose mass of scrap through a heating zone in such a manner as to cause the particles of scrap to travel at differential speeds, according to weight, into a balling zone and welding the mass of scrap into a ball in said balling zone.

3. The improvement in the art of balling scrap, which consists in subjecting the scrap to a preheating operation while spread out in a relatively thin layer, causing the particles of scrap to separate according to weight during such preheating, thereupon introducing the scrap so heated into a balling chamber and welding the same into a ball.

4. The improvement in the art of balling scrap, which consists in subjecting the scrap to a preheating operation in which it is spread out and caused to travel in a thin layer through a region of high temperature, and thereupon introducing the scrap so heated, and in a loose mass, into a zone of welding temperature and there welding the same into a ball.

5. The improvement in the art of balling scrap, which consists in subjecting the scrap to a preheating operation, keeping the same in agitation during such preheating, and thereupon introducing the scrap so heated into a balling chamber and welding the same into a ball.

6. The improvement in the art of balling scrap, which consists in subjecting the scrap, while spread out in a relatively thin layer, to a preheating in a zone of increasing temperature, causing the particles of scrap to travel through said zone at differential speeds according to weight, and thereupon introducing the scrap so heated into a balling chamber and welding the same into a ball.

7. The improvement in the art of balling scrap, which consists in subjecting the scrap while spread out in a relatively thin layer, to a preheating operation at a temperature which is gradually increased, imparting a rolling movement to the same during such preheating, and thereupon introducing the scrap so heated into a balling chamber and welding the same into a ball.

8. The improvement in the art of balling scrap, which consists in simultaneously heating the scrap, subjecting it to agitation which dislodges the adhering impurities therefrom, removing said impurities, and thereupon introducing the scrap while so heated into a balling chamber and welding the same into a ball.

9. The improvement in the art of balling scrap, which consists in simultaneously heating the scrap, subjecting it to an agitation for the purpose of dislodging the adhering impurities, at the same time subjecting it to a blast which removes said impurities, and thereupon introducing the scrap, while so heated, into a balling chamber and welding the same into a ball.

10. The improvement in the art of balling scrap, which consists in making a separation according to weight between the pieces constituting a given charge and feeding the heavier pieces into a balling chamber in advance of those relatively lighter, collecting the scrap together in said balling chamber and welding it into a ball.

11. The improvement in the art of balling scrap, which consists in making a separation according to weight between the pieces constituting a given charge and feeding the heavier pieces into a balling chamber in advance of those relatively lighter, subjecting the charge, while so being fed, to a preheating operation, collecting the scrap together in the balling chamber and welding it into a ball.

12. The improvement in the art of balling scrap, which consists in making a separation according to weight between the pieces constituting a given charge and feeding the heavier pieces into a balling chamber in advance of those relatively lighter, subjecting the charge while so being fed to a preheating operation in which the temperature is gradually increased, collecting the scrap together in the balling chamber and welding it into a ball.

13. The improvement in the art of balling scrap, which consists in making a separation according to weight between the pieces constituting a given charge, feeding the heavier pieces into a balling chamber in advance of those which are relatively lighter, agitating the charge, as it is so fed, and subjecting it to a preheating operation, collecting the scrap together in the balling chamber, and welding it into a ball.

14. The improvement in the art of balling scrap, which consists in making a separation according to weight between the pieces constituting a given charge, feeding the heavier pieces into a balling chamber before those which are relatively lighter, agitating the charge and at the same time subjecting it to a hot blast which removes the impurities dislodged by the agitation and heats the metal, collecting the scrap together in the balling chamber and welding it into a ball.

15. The process of balling scrap, which consists in subjecting the scrap to a preheating, then introducing it into a region of higher temperature and welding it into a mass by rolling together in contact with a hard surface.

16. The process of balling scrap, which consists in subjecting the scrap to a preheating operation in which the temperature is gradually increased, then introducing the same into a region of high temperature and uniting it into a ball by rotating in contact with a hard surface.

17. The process of balling scrap, which consists in spreading the scrap out in a relatively thin layer, subjecting it to a preheating operation and then introducing it into a region of high temperature in which it is rolled in contact with a hard surface.

18. The process of balling scrap, which consists in spreading the scrap out in a thin layer, imparting a rolling movement to the pieces, subjecting it to a preheating operation and then introducing it into a region of high temperature in which it is rolled in contact with a hard surface.

19. The process of balling scrap metal, which consists in making a separation between the pieces of metal constituting a charge according to the weight of such pieces, feeding the same into a zone of high temperature so that the heavier pieces enter such zone before those which are relatively lighter, reducing the metal in said zone of high temperature to a weldable condition, and uniting the same in a solid mass.

20. The process of balling scrap metal, which consists in making a separation between the pieces of metal constituting a charge according to the weight of such pieces, feeding the same through a region of gradually increasing temperature into a zone of intense heat in such manner that the heavier pieces enter said zone in advance of those which are relatively lighter, reducing the metal in said zone of intense heat to a weldable condition, and uniting the same in a mass.

21. The process of balling scrap metal, which consists in feeding by gravity a charge of the scrap through a region of gradually increasing temperature into a zone of more intense heat in such manner that an automatic separation takes place between the pieces of metal constituting the charge in accordance with the weights thereof, so that the heavy pieces reach the zone of intense heat before those which are relatively lighter, reducing the metal in such zone of intense heat to a weldable condition, and rolling the same into a mass.

22. The process of balling scrap metal, which consists in feeding, by gravity, a charge of the scrap through a region of gradually increasing temperature into a zone of more intense heat, in such manner that a separation takes place between the pieces of metal constituting the charge, in accordance with the weights thereof, so that the heavy pieces reach the zone of intense heat before those which are relatively lighter, and then welding together the metal in the zone of intense heat by causing the same to be rolled in contact with a hard surface.

23. The process of balling scrap metal, which consists in feeding the charge gradually through a region of increasing temperature into a zone of high temperature sufficient to reduce it to a weldable condition, and welding the charge into a mass in said zone by causing it to be rolled in contact with a hard surface.

24. The process of balling scrap metal, which consists in feeding the charge into a zone of intense heat by causing it to be moved over an inclined shifting surface, which makes a separation between the pieces according to their weight and carries the heavier pieces into said zone in advance of those which are relatively lighter, causing the charge when so fed to be agitated so as to remove dirt, rust and scale, and directing a hot blast from said zone of intense heat over the charge while being so fed, which blast carries off such impurities and heats the charge during the feeding operation, and uniting the metal collected in said zone of intense heat by rolling the same in contact with a hard surface when in weldable condition.

25. The process of welding scrap metal into a relatively homogeneous mass, which comprises feeding a charge of scrap metal by gravity toward a zone of welding heat, causing the parts comprising the charge to travel to the zone of welding heat at differential speeds in proportion to their respective weights, whereby the heavier parts of the charge will first enter the zone of welding heat and the lightest parts will last enter said zone, and then holding the charge in said zone until the parts thereof are welded together as required.

26. The process of welding scraps of metal into a substantially homogenous body, which comprises causing a charge of such scraps of different sizes to enter and to travel through a heated zone to a zone of higher temperature, adapted to bring the charge to welding heat, in such manner that the heavier pieces first enter the zone of welding heat and are followed by the others in proportion to their respective masses, and retaining the entire charge in the zone of welding heat, with the pieces of scrap in intimate contact with each other, until the charge is welded together as required.

27. The process of welding pieces of scrap metal of different sizes into a substantially homogeneous mass, which comprises gradually feeding a charge of such pieces by gravity toward a zone of welding heat in such manner that the heavier pieces first enter said zone, agitating the charge during such travel, whereby scale, dirt, et cetera, are loosened therefrom, directing a blast across the charge during such travel, whereby the loosened scale, dirt, et cetera are carried away, and rolling together the pieces comprising the charge as they reach the zone of welding heat until they are welded together, substantially as described.

28. The process of balling scrap, which consists in feeding a given charge of preheated scrap little by little into a region of intense heat, collecting the same therein and uniting it into a ball by rolling in contact with a hard surface.

29. The improvement in the art of welding which consists in mixing metal in finely divided form with the slag remaining in a welding chamber after a welding operation, introducing a welding charge into said chamber and subjecting the entire charge to a welding heat and agitation whereby said mixture of slag and finely divided metal is absorbed in said charge.

30. The improvement in the art of balling scrap in a rotary furnace, which consists in introducing into the balling chamber, after a ball has been removed therefrom, a quantity of finely divided metal, heating this metal and mixing it with the slag in said furnace by rotating the furnace, and absorbing the mixture so formed by rolling the next ball in contact therewith.

31. The improvement in the art of forming a mass of metal from scrap, which comprises spreading a charge of scrap so as to substantially separate all of the individual pieces, simultaneously heating all of the pieces composing the charge, then bringing together the charge thus heated and retaining it in a zone of sufficiently high temperature until the charge is welded together in a single mass.

32. The improvement in the art of forming a mass of metal from scrap, which comprises spreading a charge of scrap so as to substantially separate all of the individual pieces, simultaneously heating all of the pieces composing the charge, then bringing together the charge thus heated, and then giving such motion to the charge in a zone of high temperature that the charge is welded together in a single mass.

33. The improvement in the art of forming a mass of metal from scrap, which comprises spreading a charge of scrap so as to substantially separate all of the individual pieces, simultaneously heating all of the pieces composing the charge, then bringing together the charge thus heated, and then giving such motion to the charge in a zone of high temperature that the charge is welded together into a mass of predetermined form.

34. The improvement in the art of balling scrap, which comprises feeding a charge of scrap into a zone of high temperature, spreading the pieces of scrap composing the charge so that they are substantially separated from each other, simultaneously raising the pieces composing the charge to a welding temperature, bringing together the charge thus heated and rolling the mass thus produced in a zone of high temperature until the charge is welded into a mass of substantially spherical form.

35. The improvement in the art of balling scrap which consists in the continuous process of preheating the scrap and immediately subjecting the scrap, without intermediate cooling, to a balling operation in the presence of a welding temperature.

36. The improvement in the art of balling scrap, which comprises passing the scrap through a preheating zone directly into a zone of welding temperature and there subjecting it to a balling operation.

37. The improvement in the art of welding scrap which comprises the continuous process of preheating and agitating the scrap while spread in a thin layer, and immediately subjecting the same, without intermediate cooling, to a welding operation in a zone of welding temperature.

38. The improvement in the art of welding scrap, which comprises preheating the scrap and immediately thereupon bringing the scrap, while thus heated, together in a loose mass in a zone of welding temperature and there welding the scrap together into a single body.

39. The improvement in the art of welding scrap, which comprises preheating the scrap to a temperature less than a welding temperature and thereupon, without intermediate cooling, introducing the loose mass of scrap into a zone of welding temperature and there welding the same together into a single body.

40. The improvement in the art of welding scrap, which comprises preheating the scrap by subjecting it to a temperature which is gradually increased and thereupon, without intermediate cooling or pressing, introducing the scrap thus heated into a zone of higher temperature in which the scrap is brought to a welding heat, and there welding the same together into a single body.

41. The improvement in the art of welding scrap which comprises agitating the scrap and subjecting it to a hot blast which carries off the dislodged impurities and gives the metal a preheating, and thereupon introducing the metal so heated into a zone of welding temperature and there welding it together into a single body.

42. The improvement in the art of welding scrap, which consists in feeding a given charge of scrap into a zone of welding temperature, a little at a time, and so that the heavier pieces are introduced before those which are relatively lighter, collecting the charge together in said zone of welding temperature, and welding it into a single body.

DAVID H. LENTZ.

Witnesses:
P. H. TRUMAN,
L. A. FALKENBERG.